Figure 1:
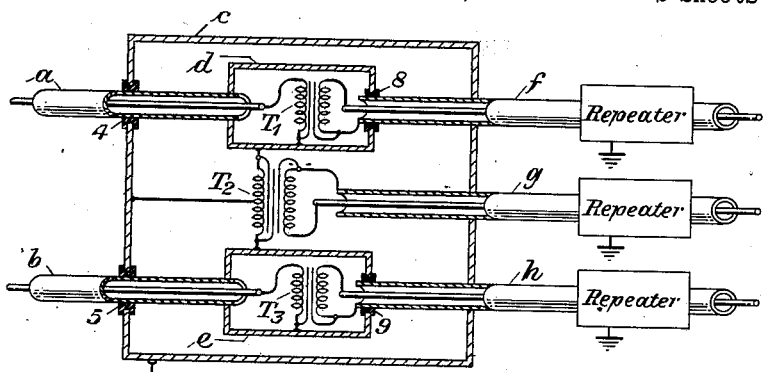

Nov. 23, 1937.   L. ESPENSCHIED ET AL   2,099,800
SHIELDED CIRCUITS FOR OPEN WIRE LINES
Filed Feb. 4, 1936   2 Sheets-Sheet 1

INVENTORS
L. Espenschied and
BY   H. E. Curtis
Claude C. Rose
ATTORNEY

Nov. 23, 1937.  L. ESPENSCHIED ET AL  2,099,800
SHIELDED CIRCUITS FOR OPEN WIRE LINES
Filed Feb. 4, 1936  2 Sheets-Sheet 2

INVENTORS
L. Espenschied and
BY  H. E. Curtis
Claude C. Rosa
ATTORNEY

Patented Nov. 23, 1937

2,099,800

UNITED STATES PATENT OFFICE 2,099,800

SHIELDED CIRCUITS FOR OPEN WIRE LINES

Lloyd Espenschied, Kew Gardens, N. Y., and Harold Everdell Curtis, East Orange, N. J., assignors to American Telephone and Telegraph Company, a corporation of New York Application February 4, 1936, Serial No. 62,354

14 Claims. (Cl. 179—15)

This invention relates to high-frequency transmission lines and more particularly to arrangements for terminating such lines or translating them to other lines.

The invention applies to cases where there are two or more high-frequency transmission lines of the shielded type running parallel to each other. In one form the invention contemplates the use of the conducting shield of each line for the transmission of two sets of useful signals; one set propagated along the inner surface of the conducting shield, and the other set propagated along the outer surface of the shield. In this manner three transmission circuits may be obtained from two shielded lines.

Shielded line structures may be disposed parallel to each other, insulated from each other and from the earth and so symmetrically disposed to the earth as to be electrically balanced thereto, as would be a two-wire line of the ordinary type. Thus a pair of shielded circuits may be mounted upon a line of poles as in an open wire line or they may be confined within a protecting shield, as would be a pair of ordinary cable conductors, and insulated therefrom by insulators having low energy losses at high frequencies. By thus arranging the circuit formed by the pair of shielded lines to be balanced-to-ground, interfering high frequency currents arising from without tend to be balanced out and thus interfering effects are minimized. In this way the outer surface of each shielded line, which in the case of a shielded pair, heretofore served electrically merely to intercept by shielding action interfering currents tending to get into the inner circuit, is also enabled to transmit useful high-frequency currents for the conveyance of intelligence.

When a pair of shielded circuits are arranged as an open-wire line, the transmission path thus formed between the outer surfaces of the two outer conductors may be expected to be subject to a higher level of interference than the paths within them. This condition of higher noise level can be dealt with in practice by transmitting the desired currents at a corresponding higher energy, making use of amplifiers en route and taking advantage of the fact that the attenuation of the outer balanced path can be held to lower values by virtue of the considerable separation between the relatively large surface of the conductors.

If, however, these two shielded conductor pairs are enclosed within a protecting sheath of conductive material, (being insulated therefrom by insulators having low energy losses) the sheath will serve in large measure to protect the transmission path formed by the two outer conductors from interference caused by external sources of electrical energy. The combination of this condition with the balanced-to-ground disposition of the shields of the shielded structures results in a reduction of external interference to a degree that the additional transmission circuit will have characteristics comparable with those of the inner shielded circuits themselves.

The purpose of this invention is to provide terminating apparatus suitable for separating these several transmissions at intermediate or terminal points. We accomplished this by either one of two methods; the first involving transformers so shielded that signal currents in any one circuit can produce no interference in the other two circuits; the second, by terminating the three circuits at such points that no mutual interference can be produced.

This invention comprehends the use of any of a number of kinds of shielded transmission lines, an example of which is the coaxial conductor. The electrical characteristics of the coaxial type of line in respect to its use in the transmission of wide bands of high-frequency currents are described in a paper published in the October, 1934 issue of the American Institute of Electrical Engineers, by Espenschied and Strieby. As is there fully disclosed, the outer conductor of the coaxial type of line serves both to shield the transmission path from outside electrical disturbances and to conduct or guide the wave-energy within it. The useful circuit is formed between the inner surface of the outer conductor and the outer surface of the inner conductor. Interfering currents due to external sources which may be picked up by the lines are confined to the outside of the outer tubular conductor by skin effect just as the desired transmission currents are confined to the inner surface.

It is, therefore, the skin effect which effects the separation between the desired and the undesired currents at high frequencies. This skin effect separation becomes quite complete for conductor walls of ordinary thicknesses at frequencies above a few tens of thousands of cycles per second, and enables the outer surface of the outer conductor to be used as a high frequency transmission medium in accordance with the present invention.

Among other circuits which this invention comprehends is the shielded pair comprising two parallel conductors, insulated from one another and surrounded by and insulated from a conducting shield. In general, the useful circuit in this case is formed between the two enclosed conductors connecting one as a return for the other. This is a balanced-to-ground circuit and the shield normally is at ground potential. Such a transmission line is disclosed in the Green-Curtis-Mead application Serial No. 674,762, filed June 7, 1933, Patent No. 2,034,032, issued March 17, 1936, and Green-Curtis application Serial No. 674,763, filed June 7, 1933, Patent No. 2,034,033, issued March 17, 1936.

Transmission lines to which the invention is applicable are not limited to those described above but include any of the shielded type.

Figure 2:
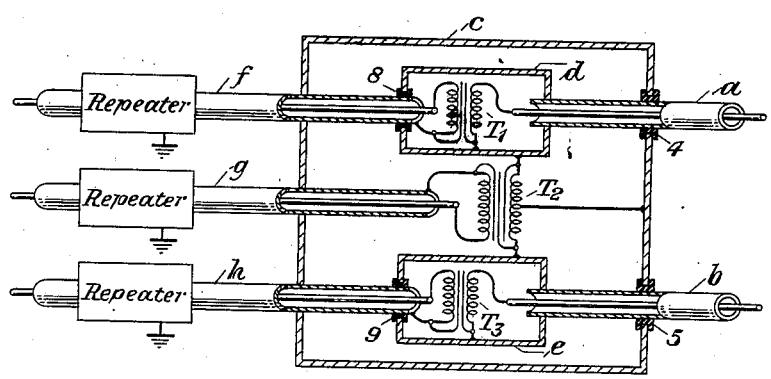
Figure 6:
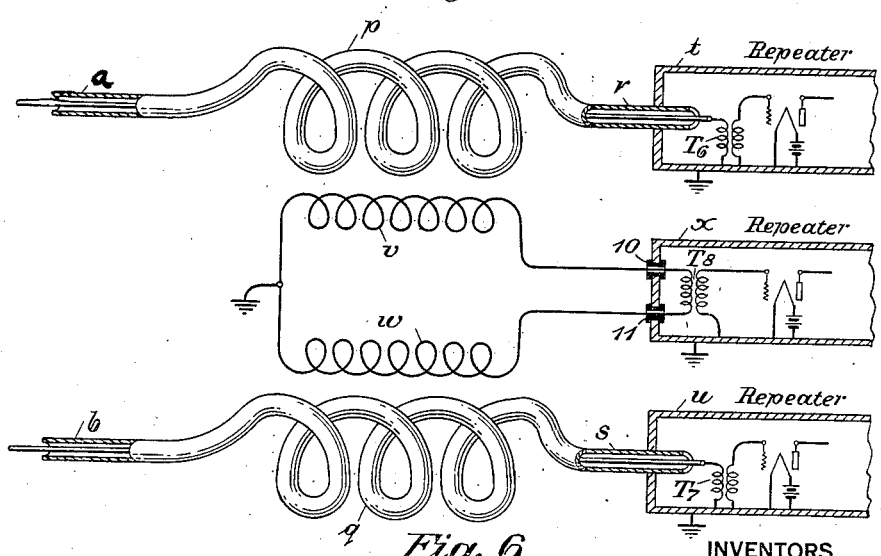
Figure 3:
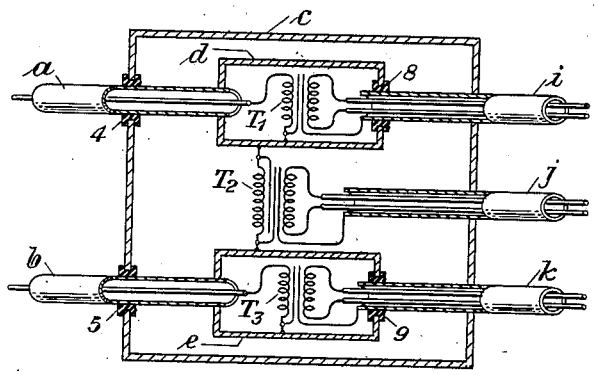
Figure 4:
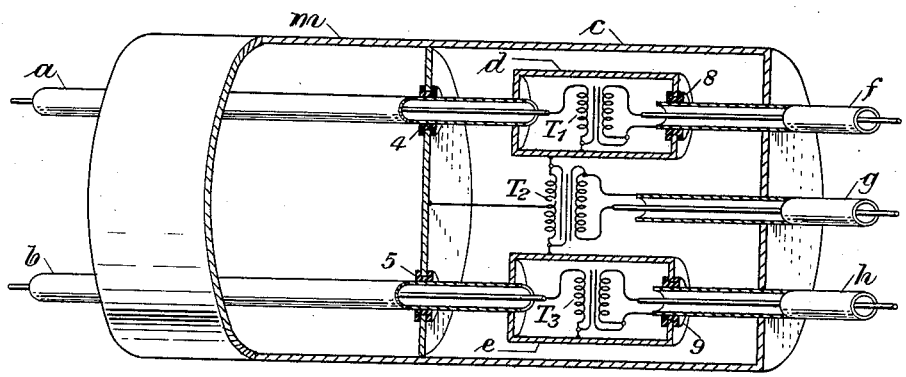
Figure 5:
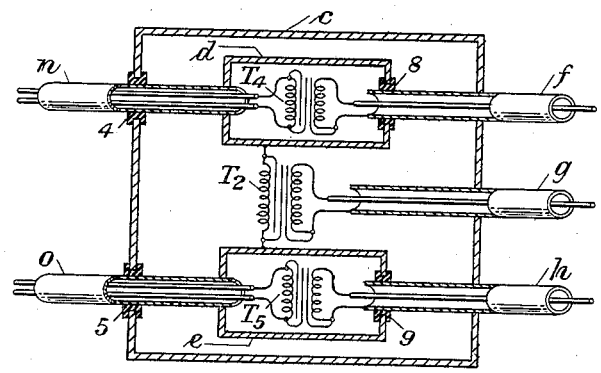
Figure 7:
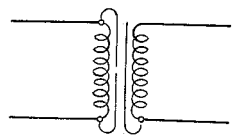

The invention will be better understood by reference to the following specification and the accompanying drawings in which Figure 1 shows one method of stepping from a two coaxial system to three independent coaxial circuits; Fig. 2 shows the reverse process; Fig. 3 shows a method of stepping from two coaxial conductors to three independent shielded pairs of wires; Fig. 4 is a modification of Fig. 1 in which the two-coaxial line is surrounded by a shield; Fig. 5 shows a method of going from two shielded pair circuits to three independent coaxial circuits; Fig. 6 is a modification of Fig. 1 for accomplishing the same results; and Fig. 7 shows an alternative type of shielded transformer for use in connection with the invention.

Referring more particularly to Fig. 1, there are shown two incoming coaxial pairs, $a$ and $b$, in which it is presumed that the outer conductors are to be used on a third transmission circuit using a frequency range which overlaps that employed in the two coaxial circuits. These two coaxial circuits $a$ and $b$ enter a metallic shielding box $c$ through insulating bushings 4 and 5. Between the outer conductors $a$ and $b$ and enclosed in the box $c$ is connected a triple shielded transformer $T_2$, the midpoint of its primary connecting to the shielding compartment $c$ which will be at ground potential. (In practice it may not be necessary to ground the midpoint of the primary of transformer $T_2$.) Two of the shields of the transformer are connected one to each end of the primary. The secondary of the transformer connects to a coaxial line $g$, the outer conductor of which is connected to the shielding compartment $c$. The third shield of the transformer $T_2$ connects to the outer conductor of the coaxial $g$, and thus the circuit which was balanced-to-ground becomes a coaxial line, unbalanced-to-ground.

The coaxial circuits $a$ and $b$ terminate in metallic compartments $d$ and $e$, to which the outer conductors are connected electrically. These compartments contain double shielded transformers $T_1$ and $T_3$, the primaries of which are connected between the inner conductors of the coaxial circuits and the shields or compartments $d$ and $e$. The secondaries of the transformers $T_1$ and $T_3$ are connected to coaxial conductors $f$ and $h$, respectively, which pass out through the compartments $d$ and $e$, through insulating bushings 8 and 9, and thence through compartment $c$ to which the outer conductors of the coaxial circuits $f$, $g$ and $h$ are connected electrically. The two interwinding shields of $T_1$ and $T_3$ are connected, one to the compartments $d$ and $e$, respectively, the other to the outer conductor of the coaxial circuits $f$ and $h$. These separate shields with which the primary and secondary windings of all the transformers are provided serve to reduce the effect of direct capacity between the windings. With this arrangement, then, the combination of the two coaxial lines and superimposed third circuit is translated to three independent coaxial circuits.

This arrangement is operative in a reverse sense to translate three independent or unbalanced-to-ground circuits into two coaxial circuits plus a superposed open-wire circuit. This is shown in Fig. 2 in which the three circuits $f$, $g$ and $h$, again shown as three coaxial circuits are combined to go out on two coaxial circuits, $a$ and $b$, plus the balanced circuit made up of the outer conductors of $a$ and $b$. The arrangement of shielding boxes, transformers and transformer shieldings is similar to that of Fig. 1. The three coaxial circuits, $f$, $g$ and $h$, of Fig. 1, could be connected directly to the three coaxial circuits, $f$, $g$ and $h$, of Fig. 2, or they could be connected to independent repeaters, as shown, and thence through the circuit of Fig. 2 to the coaxial conductor balanced circuit.

In general, along the line proper, the interference between each coaxial circuit and the outside balanced circuit is negligibly small at high frequencies because of the skin effect previously referred to. However, at the point when the balanced circuit is transformed to an unbalanced circuit, mutual interference between the three circuits will occur unless proper arrangements are made. A feature, then, of this arrangement is that it is so designed as to minimize the interference between the three circuits. This has been accomplished by using transformers, the windings of which are separated by shields, and by placing these transformers in separate compartments. If transformers $T_1$ and $T_3$ were not shielded, as described above, and the primary terminals of $T_2$ were above ground potential due to the high-frequency currents flowing over the open-wire line, the potential thus set up between the outer conductor of coaxial circuit $a$ and the outer conductor of coaxial circuit $b$ would cause current to flow through the primaries of $T_1$ and $T_3$ across to the secondaries by virtue of the interwinding capacity, and thence to ground. The currents flowing in the primaries of $T_1$ and $T_3$ would induce voltages in the secondaries, thus producing interference in the repeaters in the coaxial circuits $f$ and $h$. This is prevented by the shields between windings in $T_1$ and $T_3$.

Similarly, signal currents in the coaxial circuits $a$ and $b$ are prevented from causing interference in the open wire circuits. The boxes $d$ and $e$ are above ground potential due to the signal currents flowing in the primaries of $T_1$ and $T_3$ respectively. Hence, currents due to these potentials will try to flow to ground by way of the interwinding capacity of $T_2$. This is prevented by interwinding shields, one connected to each end of the primary of $T_2$ and one to the ground end of the secondary of the same. Thus, the interfering currents are prevented from flowing in the primary of transformer $T_2$ and being induced into the coaxial circuit $g$.

The coaxial conductors $a$ and $b$ may themselves be subjected to an added source of interference due to potential between the two coaxial circuits in parallel and ground due to electromagnetic fields such as static or radio. Such interference is propagated along the two outer conductors of the coaxial circuits until it reaches the transformer $T_2$ where it is immediately shunted to ground by the shields in the transformer before it can flow in the windings of the transformer and cause interference in the coaxial circuit $g$.

The metallic compartments d and e are at a potential above ground equal to that of the coaxial circuits a and b and accordingly are protected by the additional metallic shielding box c which, being insulated from a and b, may be grounded to the shields of coaxial circuits f, g and h. The box c may be dispensed with if desired and transformer $T_2$ may also be enclosed in a separate metal compartment grounded to the coaxial circuit g.

Fig. 3 shows a method of translating a system comprising two coaxial circuits and one derived open-wire circuit to a system comprising three independent shielded pair circuits. In this figure there are shown two incoming coaxial pairs, a and b, in which it is presumed that the outer conductors are to be used on a third transmission circuit using, at least in part, the same frequency range as is used on the inner circuits of the coaxial circuits. These two coaxial circuits a and b enter a metallic shielding box c through insulating bushings 4 and 5. Leaving the box c are three shielded pair circuits i, j and k. Inclosed in the box c is an arrangement similar to that in Fig. 1, the shields of the transformers being connected in the same manner. It is apparent from the preceding discussion of Fig. 1, which applies here, that in this manner a two-coaxial system can be transformed according to Fig. 3 to a three-shielded pair system without interference between the various transmission circuits. With this arrangement, then, the coaxial open-wire arrangement becomes entirely shielded pair.

The reverse problem of getting three independent balanced-to-ground circuits on to two coaxial circuits plus a derived open-wire circuit is solved by turning Fig. 3 end for end, in which case, circuits i, j and k become the inputs rather than the output.

The coaxial circuits a and b instead of being arranged as in Figs. 1 and 3, and thus constituting what is called an open-wire line may in turn be surrounded by another conducting shield m which itself is connected to the box c as shown in Fig. 4.

Referring to Fig. 5, there is shown a method of changing two shielded pair circuits plus a superimposed third circuit into a three coaxial circuit. The former combination comprises two shielded pair structures, side by side but insulated from one another, each of the enclosed pair of conductors comprising a high-frequency circuit, with the outer surface of the two shields serving to form a third balanced pair circuit. Each of the derived coaxial structures provides a single transmission system as in Fig. 1.

The problem in this case is slightly different from the preceding cases in that there is no potential from the shields of the pairs to ground due to currents flowing in the pairs and accordingly the T transformers do not need to be shielded on this account. However, interfering currents due to radio signals or similar disturbances might be propagated down the shields of the pairs n and o in parallel to the transformer $T_2$. If the transformer were unshielded the two ends of the primary might be unbalanced to ground and therefore unless a shield is tied to the ground end of the secondary, interference may be produced in the coaxial circuit g. Shields are also shown connected to each end of the primary of $T_2$ as an extra precaution that the two ends of the primary are balanced-to-ground. The latter two shields in many practical instances may not be necessary.

Also it will be observed that the shields of n and o are above ground potential due to the currents flowing in the open-wire circuit comprising the two shields of the shielded pairs n and o, one as a return for the other. This potential causes current to flow across the capacity between the shields of the pairs and the two enclosed wires in parallel, hence through transformer $T_4$ and $T_5$ respectively to ground and, thereby inducing interference into coaxial circuits f and h. Triply shielding the transformer $T_4$ and $T_5$ by connecting a shield to each end of the primary and a third shield to the ground end of the secondary completely eliminates the interference by shunting the interfering currents flowing on the enclosed pairs directly to ground before they can flow in the windings of the transformers.

A modification of Fig. 1, but one which accomplishes the same result, is shown in Fig. 6 in which, again the outer conductors of the two coaxial circuits a and b form the two wires of the open-wire transmission line. In this modification the coaxial circuits a and b are coiled up to form windings p and q respectively, of a transformer. These windings are identical with one another and are wound in such a direction with respect to one another that the two ends r and s become the electrical midpoint of the open-wire circuit. Since this point is at ground potential, the other conductors of the coaxial circuits may be grounded at this point and beyond. The coaxial circuits r and s may continue as coaxial circuits or may be connected to terminal equipment or repeaters. In the figure these coaxial circuits are shown as passing into shielded compartments t and u, which are electrically connected to the outer conductors of the coaxial circuits, allowing the compartments to be grounded. These coaxial circuits terminate in unbalanced-to-ground transformers $T_6$ and $T_7$, one terminal of each winding being connected to the shielded compartment and hence to ground. Thus, it is impossible for currents in either coaxial circuit to produce interference in the other, since the coaxial currents always flow on the inside of the outer coaxial conductor in this arrangement. The secondaries of the transformers $T_6$ and $T_7$ are shown as going to any suitable repeaters, preferably included within the compartments t and u.

The signal frequencies traveling on the open-wire circuit are taken off by means of the windings v and w, which in connection with windings p and q, form a transformer. One of the ends of each of the windings v and w is connected together, at which point it may be grounded. The other two ends pass through two insulating bushings, 10 and 11, into a shielded compartment x and to the transformer $T_8$. One terminal of the secondary of the transformer $T_8$ is connected to the compartment and hence to ground. The shielded compartment x also contains a repeater of which the transformer $T_8$ is a part.

Since the outer conductors of the coaxial circuits at r and s and the compartments t and u are at ground potential, it is impossible for currents flowing in the open-wire circuit to flow through the transformers $T_6$ and $T_7$ and cause interference in the two coaxial circuits. At the same time currents flowing in the coaxial circuits are prevented by the shielding effects of their outer conductors and shielded compartments from causing interference in the open-wire circuit.

It is evident that this same method can equally well be applied to arrangements where the shielded circuits are other than coaxial.

The conductor arrangements might take yet other forms. For example, only one conductor of an open-wire line might comprise a shielded circuit, the second conductor being a conventional solid conductor or its equivalent, both shielded circuit and open-wire circuit being used to transmit wide frequency bands. In this case as in all the previous ones the signal bands on the various circuits may be separated without mutual interference by shielding the transformers as indicated in the above.

The shields in transformer $T_2$ in Figs. 1, 2, 3 and 5 and the shields in $T_4$ and $T_5$ in Fig. 5 may preferably be arranged as shown in Fig. 7 instead of as shown in the above mentioned figures.

It will be obvious that the general principles herein disclosed may be embodied in many other organizations widely different from those illustrated without departing from the spirit of the invention as defined in the following claims.

What is claimed is:

1. In a transmission system, two coaxial conductor pairs, each serving as a separate physical transmission circuit, the outer conductors being insulated from the ground, a third transmission circuit comprising the outer conductors of the two coaxial conductor pairs, means for separating messages over the three circuits from each other, said means including a transformer for each coaxial pair, means for connecting each outer conductor through a winding, and a secondary winding associated with said winding for picking up messages from the third circuit.

2. In a transmission system, two coaxial conductor pairs, each serving as a separate physical transmission circuit, the outer conductors being insulated from the ground, a third transmission circuit comprising the outer conductors of the two coaxial conductor pairs, means for separating messages over the three circuits from each other, said means including a connection for each coaxial circuit to a separate repeater, means for connecting each outer conductor through a winding, and a secondary winding associated with said winding for picking up messages from the third circuit.

3. In a transmission system, two coaxial conductor pairs, each serving as a separate physical transmission circuit, the outer conductors being insulated from the ground, a third transmission circuit including the outer conductors of the two coaxial conductor pairs, means for taking the message from the third circuit without interference from the other circuits comprising a transformer winding connected between the outer conductors of the coaxial pairs, with midpoint grounded and serving as the primary, and a secondary winding associated therewith.

4. The combination of claim 1, characterized by the fact that the outer conductors are grounded through windings consisting of several turns of the coaxial pairs.

5. The combination of claim 1 characterized by the fact that the outer conductors are grounded through windings consisting of several turns of the coaxial pairs, the secondary winding going to an independent circuit.

6. The combination of claim 1 characterized by the fact that separate grounded circuits are associated with the transformers for each coaxial pair and the secondary associated with said third circuit, respectively, said grounded circuits transmitting messages from the three circuits formed from the coaxial conductor pairs.

7. The combination of claim 1, characterized by the fact that the outer conductors are grounded through windings consisting of several turns of the coaxial pairs, and that separate unbalanced-to-ground circuits are associated with the transformers for each coaxial pair and the secondary associated with said third circuit, respectively, said grounded circuits transmitting messages from the three circuits formed from the coaxial conductor pairs.

8. The combination of claim 1, characterized by the fact that each transmission circuit goes into a separate shielded repeater.

9. In a transmission system, two coaxial conductor pairs, each serving as a separate transmission circuit, the outer conductors being insulated from the ground, a third transmission circuit comprising the outer conductors of the two coaxial conductor pairs, means for separating the messages over the three circuits from each other, comprising a metallic box into which each coaxial pair enters but is insulated therefrom, three extension coaxial pairs extending from within the box and continuing therefrom with the outer conductors electrically connected to the box, an inner metallic box into which one of the entering coaxial pairs enters, with outer conductor connected to the box, and from which one of the exiting coaxial pairs exits, with outer conductor insulated therefrom, a transformer therein with primary connected from the inner to the outer conductor of the entering pair, and the secondary connected from the inner to the outer conductors of the exiting pair, a second similar box with the same contents and similar connections to the other entering pair and another of the exiting pairs, a third transformer within the outer box with primary connected from the one inner box to the other inner box, with midpoint of the winding connected to the outer box, and with the secondary of the transformer connected from inner to outer conductor of the third exiting coaxial pair.

10. The combination of claim 9, characterized by the fact that each of the transformers has shields between the primary and secondary windings.

11. In a transmission system, two coaxial conductor pairs, each serving as a separate physical transmission circuit, the outer conductors being insulated from the ground, a third transmission circuit comprising the outer conductors of the two coaxial pairs, means for impressing thereon three separate messages from three independent coaxial pairs, said means comprising a transformer for each of the two first-named coaxial pairs, and means for grounding each outer conductor through a winding, said windings constituting the secondary of a transformer, and a primary winding associated therewith for impressing a third message upon the said third circuit.

12. A system of transmission circuits derived from a plurality of conductors, including a shielded conductor and a conductor external thereto said shielded conductor being connected in one circuit, a second shielded conductor and a conductor external thereto, said second shielded conductor being connected in a second circuit, said conductors being insulated from one another, said external conductors being connected to form a third circuit, a second system of transmission circuits derived from a number of pairs of conductors, each of said conductors of said second system being used in only one transmission circuit, means for connecting together corresponding circuits of the two systems, said connections including means to shield said circuits from interference between one another.

13. The combination of high-frequency transmission circuits including a pair of circuits each having a substantially gaseous dielectric or its equivalent for insulating its conductors and each adapted to transmit currents of frequencies above the voice range, a conducting shield for each of said circuits whereby the transmission path for such high frequencies is confined by skin effect substantially within the shield and is protected from outside interfering effects of correspondingly high frequency, and means for setting up between the outer surfaces of the said two shields a third circuit likewise adapted to transmit frequencies above the voice range.

14. A system of transmission circuits derived from a plurality of conductors, including a shielded conductor, a conductor internal thereto and insulated therefrom, and forming with the inner surface of the shielded conductor a circuit for the transmission of frequencies above the voice range, a second shielded conductor, a conductor internal to said second shielded conductor and insulated therefrom, and forming with the inner surface of said second shielded conductor a circuit for the transmission of frequencies above the voice range, and a connection from the external surface of one external conductor to that of the other to form a third circuit for the transmission of frequencies above the voice range.

LLOYD ESPENSCHIED.
HAROLD EVERDELL CURTIS.